(12) United States Patent
Marin et al.

(10) Patent No.: US 8,382,283 B2
(45) Date of Patent: Feb. 26, 2013

(54) METHOD FOR PROVIDING A SPECTACLE OPHTHALMIC LENS BY CALCULATING OR SELECTING A DESIGN

(75) Inventors: Gildas Marin, Charenton le Pont (FR); Martha Hernandez, Charenton le Pont (FR)

(73) Assignee: Essilor International (compagnie Generale d'optique), Charenton le Pont (FR)

( * ) Notice: Subject to any disclaimer, the term of this patent is extended or adjusted under 35 U.S.C. 154(b) by 341 days.

(21) Appl. No.: 12/680,971

(22) PCT Filed: Oct. 6, 2008

(86) PCT No.: PCT/EP2008/063355
§ 371 (c)(1),
(2), (4) Date: Mar. 31, 2010

(87) PCT Pub. No.: WO2009/043941
PCT Pub. Date: Apr. 9, 2009

(65) Prior Publication Data
US 2010/0296053 A1  Nov. 25, 2010

(30) Foreign Application Priority Data
Oct. 5, 2007  (EP) .................................... 07301437

(51) Int. Cl.
*A61B 3/10* (2006.01)

(52) U.S. Cl. ........................................ 351/205; 351/246
(58) Field of Classification Search .................. 351/177, 351/205, 246
See application file for complete search history.

(56) References Cited

U.S. PATENT DOCUMENTS

| | | | |
|---|---|---|---|
| 6,382,789 B1 | 5/2002 | Baudart et al. | |
| 6,786,602 B2* | 9/2004 | Abitbol | 351/246 |
| 7,331,668 B2 | 2/2008 | Azar et al. | |
| 2009/0326652 A1 | 12/2009 | Azar | |
| 2010/0002191 A1 | 1/2010 | Drobe | |

FOREIGN PATENT DOCUMENTS

| | | |
|---|---|---|
| EP | 0990939 | 4/2000 |
| FR | 2912820 | 8/2008 |
| WO | WO2004/072709 | 8/2004 |
| WO | WO2008/077006 | 6/2008 |
| WO | WO2008/104695 | 9/2008 |

* cited by examiner

*Primary Examiner* — Hung Dang
(74) *Attorney, Agent, or Firm* — Occhiuti Rohlicek & Tsao LLP (57) ABSTRACT

A method for providing a spectacle ophthalmic lens to a wearer, the method comprising: measuring the higher order aberrations in at least an eye of the wearer; calculating a design of the spectacle ophthalmic lens or selecting a design in a spectacle ophthalmic lens design data base by adapting the management of residual astigmatism based on the measure of higher order aberrations in the eye of the wearer.

14 Claims, 6 Drawing Sheets

METHOD FOR PROVIDING A SPECTACLE OPHTHALMIC LENS BY CALCULATING OR SELECTING A DESIGN

CROSS-REFERENCE TO RELATED APPLICATIONS

This application is the National Stage of International Application No. PCT/EP2008/063355, filed on Oct. 6, 2008, which claims the priority of European Application No. 07301437.5, filed on Oct. 5, 2007, the contents of which are incorporated herein by reference in their entirety.

TECHNICAL FIELD

The invention relates generally to the field of vision improvement and more specifically concerns a method for providing an spectacle ophthalmic lens by calculating or selecting a design. The spectacle ophthalmic lens can be, e.g., a progressive lens, a unifocal lens. The invention also concerns a method for making a spectacle ophthalmic lens. Furthermore, the invention concerns a piece of software set up for implementing the calculation method for the design of an spectacle ophthalmic lens of the invention.

BACKGROUND OF INVENTION

Spectacle ophthalmic lenses are worn and widely used for correcting many different types of vision deficiencies. These include defects such as near-sightedness (myopia) and far-sightedness (hypermetropia), astigmatism, and defects in near-range vision usually associated with aging (presbyopia).

Ophthalmologists or optometrists routinely improve the visual acuity by correcting refractive errors in terms of sphere, cylinder and axis. Said refractive errors are low order aberrations.

Astigmatism occurs when the refractive error in an eye is meridian-dependent. This is usually due to one or more refractive surfaces, most commonly the anterior cornea, having a toroidal shape. The astigmatic refractive error is a second-order aberration.

A problem that the invention aims to solve is to better meet the visual needs of lens users and improve the comfort of lens users, particularly users of progressive lens, and facilitate their adapting to the lenses.

SUMMARY OF THE INVENTION

For this purpose, one subject of the invention is a method for providing a spectacle ophthalmic lens to a wearer, the method comprising the following steps:
  measuring the higher order aberrations in at least an eye of the wearer;
  calculating a design of the spectacle ophthalmic lens or selecting a design in an spectacle ophthalmic lens design data base by adapting the management of residual astigmatism based on the measure of higher order aberrations in the eye of the wearer.

In the frame of the present invention a "design" of a spectacle ophthalmic lens has to be understood as the part of the optical system of said lens which is not determined by the wearer standard prescription parameters consisting of sphere, cylinder, axis and power addition values determined for said wearer.

DETAILED DESCRIPTION OF THE INVENTION

According to embodiments of the present invention, the calculation or selection of the design for the wearer relates to one eye or both eyes of the wearer.

In addition to second-order aberrations, human eyes usually have a number of other aberrations in refractive surfaces. Recent improvements in technology, such as ophthalmic wavefront sensors, have provided higher degree of measurement than the standard sphero-cylindrical averaged refractive error. Zernike polynomials are typically used to describe refractive errors for optical systems. Zernike basis sets can accurately describe a map of the full refractive error.

According to an embodiment of the invention, a calculation method for the design of a spectacle ophthalmic lens includes:
  a step of measuring the higher order aberrations in the eyes of the lens user; and
  a step of calculating a design of a spectacle ophthalmic lens by adapting the management of residual astigmatism based on the measure of the higher order aberrations in the eyes of the lens user.

Spectacle ophthalmic lenses, and particularly progressive lens, are fraught with residual aberrations, mostly astigmatism. Thus, the invention provides for customizing the management of residual astigmatism based on the higher order aberrations of the user eyes and thus optimizing the acuity/distortion compromise. In fact, the inventors were able to verify that the impact of residual astigmatism on vision depends on the presence of higher order aberrations. Astigmatism and higher order aberrations combine to improve or reduce visual performance based on their respective orientations. Specifically, the higher these higher orders are, the lower the sensitivity to astigmatism of a subject will be.

Aberrometers, that are wavefront sensors for the specific measurement of the eye, are instruments designed to measure the wavefront of the eye, including sphere, cylinder and the higher-order aberrations.

Using such instrument makes possible to measure and/or calculate the aberrations level of an eye and separate the contribution of low and higher order aberrations.

According to an embodiment of the present invention, the calculation or selection of the design for the wearer is performed thanks to an higher order aberrations parameter calculated with the higher order aberrations measured data in the eye of the wearer and where said higher order aberration parameter is chosen in a list consisting of higher order aberrations RMS (root mean square) values (HOA RMS), the Strehl Ratio, the Pupil Ratio, the Modulation Transfer Function (MTF) volume. It has to be noticed that the lower is the higher order aberration level, the lower is the HOA RMS value but the higher is the Strehl Ratio (maximum value: 1) and the higher is the MTF volume.

Among the parameters known in the state of the art which are characteristic of the higher order aberrations of an optical system are non limiting following: "higher order aberrations RMS (Root Mean Square) value", "Strehl Ratio", "Pupil Ratio", the "Modulation Transfer function volume".

It is then possible to calculate those using aberrometers measurement of an eye.

"Higher order aberrations Root Mean Square" is usually written as HOA RMS; its unit is usually micrometer (µm).

In absence of aberrations, the intensity is a maximum at a Gaussian image point. "Strehl Ratio" is used to characterize aberrations: it is the ratio of the intensity at the Gaussian image point (the origin of the reference sphere is the point of maximum intensity in the observation plane) in the presence of higher order aberrations, divided by the intensity that would be obtained if no aberration were present.

MTF is the function that represents the amplitude of the modulation (or the contrast of a sinusoidal periodic structure) in the image obtained from the object by the optical system for each spatial frequency (see for example: Handbook of lens design, Malacara D. & Malacara Z. pages 295 to 303, 1994 Marcel Dekker Inc.). It is possible to calculate the volume of the MTF by integrating this function over a spatial frequency range that is typically between 0 and infinity. Many other typical parameters are describe in "Accuracy and precision of objective refraction from wavefront aberrations", Larry N. Thibos, Xin Hong, Arthur Bradley, Raymond A. Applegate, Journal of Vision (2004) 4, see pages 329 to 351.

Higher order aberrations RMS value may be measured using wavefront analysis. An aberrometer is designed to measure the wavefront of the eyes including sphere, cylinder, and the higher-order aberrations. Shack-Hartmann aberrometry is known as the most popular way to measure aberrations of the human eye in use today. Commercial ophthalmic Shack-Hartmann aberrometers are for example sold by Wave Front Sciences Inc, VISX, ALCON, Imagine Eyes (see for example irx3 aberrometer).

Said aberrometers measure the wavefront shape by measuring the distance between the wavefront surface refracted by an eye's optic and a reference plane located in the eye's entrance pupil. This distance is known as the wavefront error. A Shack-Hartmann data set consists of a large array of numbers (wavefront errors) for different position on the pupil plane. As a whole, the entire data set is called the wavefront.

The wavefront can be analysed using Zernike polynomials. Such an analysis is for example recommended by the Optical Society of America (OSA) for describing ocular wavefront aberrations, but other polynomials, such as for example Taylor series or splines can also be used to mathematically describe a wavefront.

The Zernike expansion presents the aberrations in an orthogonal set of polynomials. It can be displayed in the form of a pyramid. Vertically each row represents a typical form of aberration; these are called (radial) orders. The top is called the zero order, which actually is no aberration but a constant that can be added for e.g. scaling. The second row (the first order) represents prismatic effects. Each presentation of an aberration is called a term. The prismatic effects are based vertical (Z-term 2, up or down) and horizontal (Z-term 3, in or out). Since the zero and first orders (Z-terms 1-3) are linked to specific visual defects, or to specific measurement conditions, these are usually not pictured. It starts to become interesting as of the second order. In the middle of the pyramid, defocus (Z-term 4) can be found. It is placed at the axis line of the pyramid. This is because defocus (spherical part of a refraction) is rotational symmetric (zero angular frequency). On both sides of defocus, the astigmatic (cylinder in the refraction) terms Z-3 and Z-5 can be found. These are special conditions of defocus because they work in one meridian only. Consequently these must be indicated with a direction (axis of the cylinder), Z-3 for oblique astigmatism and Z-5 for horizontal astigmatism. The third order aberrations include coma and trefoil, each has a direction, so no Z-term in this row at the middle. Next are 5 terms of the $4^{th}$ order. Spherical aberrations (Z-12) is rotational symmetric, the other terms (with a direction) are secondary astigmatism and tetra foil. For describing aberrations in optics the pyramid continues with many more orders and terms. Usually these are in the eye not present or very low. Even within the 14 Z-terms as discussed not all terms are of equal importance to the eye. For the eye the second order aberrations are called "low order aberrations" and include the sphere and cylinder value of the refraction. Third orders and above are called "higher order aberrations".

A higher order aberrations Root Mean Square (RMS) value can then, for example, be calculated using the Zernike polynomials components values of the wavefront aberrations function, which order is equal or higher than 3.

In order to compare higher order aberrations RMS values of different eyes, it is useful to normalize said RMS value according to a reference diameter pupil.

The inventors have chosen to normalize the measured RMS values according to a 5 mm diameter pupil but any other diameter pupil also work. Each person has been characterized by the HOA RMS (higher order aberrations RMS value) mean value of both eyes. Wavefront of each eye of the person have been measured. Classically, on the softwares linked to the wavefront, the RMS (Root-Mean Square) of the wavefront is calculated on a specified diameter which is smaller that the pupil diameter. The following calculating method has been used:
  fit a Zernike polynomial of the wavefront limited to the given diameter;
  calculate the RMS of higher order aberrations of this Zernike polynomial;
  results are HOA $RMS_R$ for the right eye, and HOA $RMS_L$ for the left eye.

According to an embodiment of the present invention, the spectacle ophthalmic lens is a spectacle progressive addition lens.

According to an embodiment of the present invention, the calculation or the selection of the design for the wearer is performed according to a progressive addition lens hardness parameter.

In the frame of the present invention, a "lens hardness parameter" has to be understood as a parameter suitable for characterizing ophthalmic lens peripheral aberrations management. Said aberrations management relates to the vision fields apertures in the far and near vision zones and thus to the variation degree of aberration along the ophthalmic lens periphery. According to non limiting examples, a lens hardness parameter is maximum astigmatism gradient on a lens surface, or maximum dioptric power gradient on a lens surface, or a combination thereof.

Progressive lens designs are broadly categorised as either "hard" type designs or "soft" type designs based on the distribution of power and astigmatism.

Hard lens designs concentrate the progressive optics into smaller regions of the lens surface, thereby expanding the areas of clear vision at the expense of elevating the gradients and overall magnitude of unwanted cylindrical power in the periphery.

Soft lens designs spread the progressive optics across larger regions of the lens surface, thereby reducing the gradients and overall magnitude of unwanted cylindrical power at the expense of narrowing the areas of clear vision.

Soft lens designs typically use a longer progressive corridor length with a relatively slow progression of addition power, while hard lens designs typically use a shorter corridor length with a relatively rapid progression of addition power.

According to embodiments of the present invention:
  the higher order aberration parameter is the HOA RMS value and the calculation or the selection of the design for the wearer is performed so as the lower is the HOA RMS value, the harder is the design for the wearer and accordingly the higher is the HOA RMS value, the softer is the design for the wearer; it has to be understood that the same teaching applies to higher order aberration parameters that decrease when the higher order aberrations level decreases, whereas the present invention teaches that the highest, respectively the lowest, is the higher order aberration parameter value, the harder, respectively the softer, is the design for the wearer when the higher order aberration parameter value increases when the higher order aberrations level decreases, such as Strehl ratio, or modulation transfer function volume;

the higher order aberration parameter is the HOA RMS value and, if the HOA RMS value is less than 0.2 μm for a 5 mm pupil, the calculated or selected design for the wearer is a hard design, and if the HOA RMS value is more than 0.2 μm for a 5 mm pupil, the calculated or selected design for the viewer is a soft design;

the higher order aberration parameter is the RMS value, and the higher order aberrations are measured for both left (L) and right (R) eyes and wherein a design parameter (DP1) is used to calculate or select the design for the wearer, where:

$$DP1=((HOA\_RMS^2_R+HOA\_RMS^2_L)^{1/2}-HOA\_RMS_{min})/HOA\_RMS_{max}$$

and where:
$HOA\_RMS_R$ and $HOA\_RMS_L$ are respectively the HOA RMS values for the right eye and for the left eye; $HOA\_RMS_{min}$ and $HOA\_RMS_{max}$ are respectively a minimum and a maximum threshold value; according to an example $HOA\_RMS_{min}$ is 0.1 μm and $HOA\_RMS_{max}$ is 0.4 μm.

a design parameter (DP2) is used to calculate or select the design for the wearer, where:

$$DP2=EHC+(1-EHC)\times DP$$

where: EHC is the Eye-head coefficient,
DP is a design parameter calculated thanks to a higher order aberrations parameter. According to an example DP=DP1.

In the frame of the present invention, "Eye-head coefficient" is a coefficient suitable to characterize the relative amplitudes of movements respectively of the eyes and of the head of a wearer when the gaze direction of the wearer is changing. An eye-head coefficient can be measured for a wearer thanks to a "eye/head" movement coordination test.

According to an embodiment, the EHC is a function of angular deviation ($\alpha_T$) of the wearer's head divided by an angular eccentricity (E) of a target which the wearer is looking at. Said EHC is equal to 1 for a wearer who has only turned his head when looking at the target and equal to 0 for a wearer who has only turned his eyes when looking at the target.

The invention also relates to a method for manufacturing a spectacle ophthalmic lens for a wearer, the method comprising the following steps:
a) measuring the higher order aberrations in at least an eye of the wearer;
b) calculating a design of the spectacle ophthalmic lens or selecting a design in a spectacle ophthalmic lens design data base by adapting the management of residual astigmatism based on the measure of higher order aberrations in the eye of the wearer;
c) providing a lens substrate;
d) manufacturing the spectacle ophthalmic lens according to the optical system (OS) corresponding to the calculated or selected design in step b).

According to different embodiments, said method for manufacturing incorporates the previously described features and the different embodiments of the preceding method for providing a spectacle ophthalmic lens to a wearer.

The invention also relates to a computer program product comprising one or more stored sequence of instruction that is accessible to a processor and which, when executed by the processor, causes the processor to carry out at least one of the steps of the different embodiments of the preceding methods.

The invention also relates to a computer-readable medium carrying one or more sequences of instructions of the preceding computer program product.

Unless specifically stated otherwise, as apparent from the following discussions, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The features of the present invention, as well as the invention itself, both as to its structure and its operation, will be best understood from the accompanying non limiting drawings and examples, taken in conjunction with the accompanying description, in which:

BRIEF DESCRIPTION OF THE DRAWINGS

Figure 1:
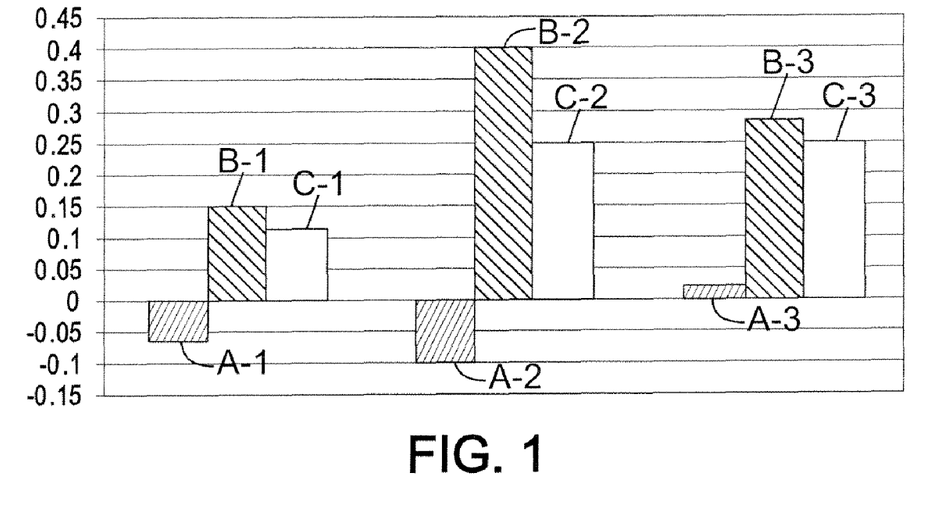
FIG. 1 shows data resulting from visual characteristics of five subjects.

FIG. 1 shows the mean effects in five subjects of three corrections on visual acuity and Root Mean Square (thereafter referred to as RMS) of the aberrant wave front with relation to a plane wave front. In these three corrections, focusing was identical and adjusted for optimal visual acuity of the subject.

DESCRIPTION OF PREFERRED EMBODIMENTS

In the bar graph, the bars labelled "A" (A-1 to A-3) show the loss of visual acuity as the logarithm of the Minimum Angle Resolution (MAR) in minutes of arc, thereafter referred to as logMAR, calculated for each of the three corrections with relation to a reference value obtained with the usual correction. In the bar graph, the bars labelled "B" (B-1 to B-3) show the RMS of residual higher order aberrations remaining after correction, in micrometers (μm). In the bar graph, the bars labelled "C" (C-1 to C-3) show the RMS of the sum of the residual aberrations remaining after correction and including astigmatism, in micrometers (μm).

On the left-hand side corresponding to data A-1, B-1, C-1, the total correction of aberrations (including the higher order ones), with a residual RMS of higher orders of 0.12 μm and a residual RMS of the sum of the aberrations of 0.15 μm, corresponds to the minimal values obtained after correction using an adaptable optical system with an adjustable mirror. These two bars show how difficult it is to obtain a good full correction, even when using a complex system with an adjustable mirror.

In the centre corresponding to data A-2, B-2, C-2 and on the right-hand side corresponding to data A-3, B-3, C-3, two corrections are shown obtained using the same system when only astigmatism was corrected in addition to focusing. The RMS of the higher orders (bars labelled "C", C-2 and C-3) are identical in both cases and correspond to the non-corrected value (0.25 μm). On the right-hand side, the objective correction corresponds to the best optical correction of astigmatism. For this correction, the total RMS (bar labelled "B", B-2 and B-3, 0.28 μm) was practically identical to the RMS of the higher orders (bar labelled "C", C-2 and C-3, 0.25 μm), considering the system sensitivity. In the centre, the subjective correction is the astigmatism correction preferred by the subject. It can be obtained by a standard refraction method.

The loss of visual acuity resulting from each of the three corrections is shown by the bars labelled "A". A negative loss indicates an improvement of visual acuity. Results show that the subjective correction makes it possible to reach the best visual acuity in spite of the fact that it corresponds to the optical quality with the lowest value, as measured by the RMS of aberrations. Therefore, the residual astigmatism desired by the subject compensates for the non-corrected higher orders. A good compromise between residual astigmatism and higher orders can provide results that are more satisfying for the lens user.

Figure 2:
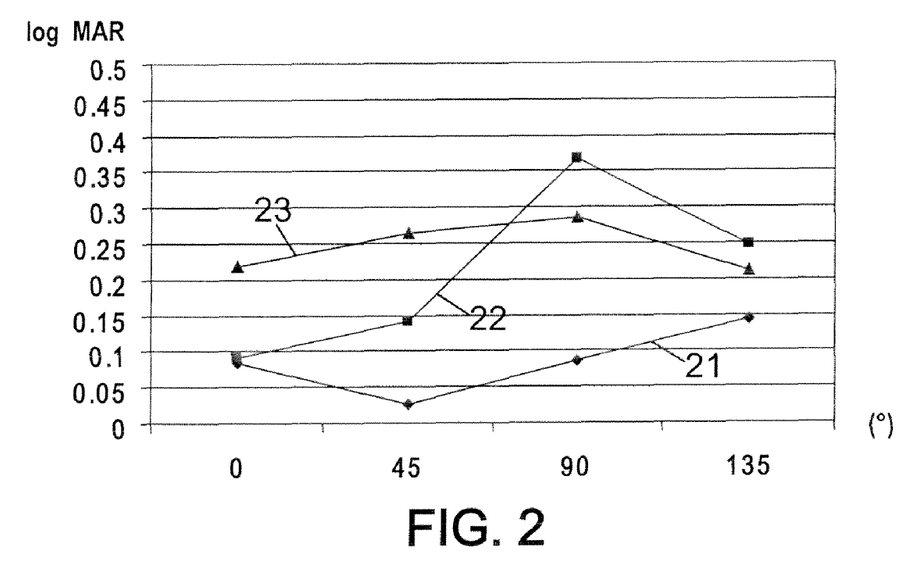
FIGS. 2 to 4 show results of the effects of astigmatism on visual acuity.
Figure 3:
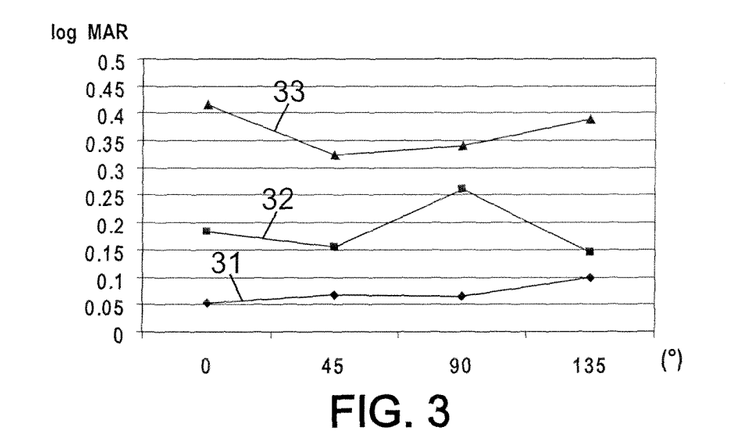

FIGS. 2 and 3 show the effects of astigmatism on visual acuity depending on its module (three levels of RMS, viz. 0.25 μm for curve 21, 31; 0.5 μm for curve 22, 32; and 0.75 μm for curve 23, 33) and its axis, either with correction of the higher orders of the eye (FIG. 2) or without correction of the higher orders of the eye (FIG. 3).

In both cases, focusing was identical and adjusted for optimizing visual acuity. In FIG. 2, without correction of the higher orders, acuity varied practically with the astigmatism axis, particularly for the intermediate level: astigmatism combined with the higher orders in increasing or decreasing visual acuity. In FIG. 3, with correction of the higher orders, the effect of the axis was less noticeable: the effect of astigmatism was practically independent from the axis.

Figure 4:
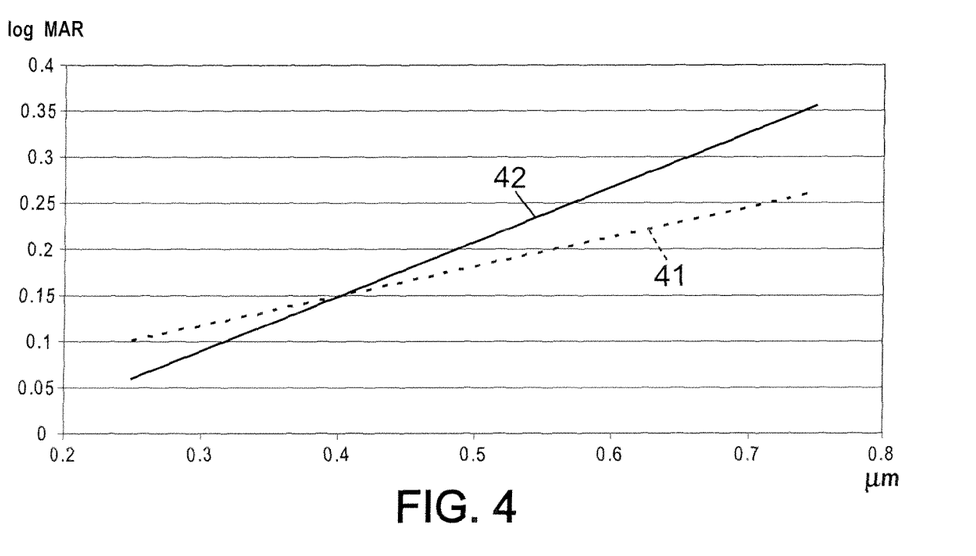

FIG. 4 shows the effects of astigmatism on visual acuity depending on its module (RMS level in μm), averaged across all of the axes, for various original corrections of the higher orders of the eye. The total correction (solid line), including correction of the higher orders, results in the steepest slope: thus, when the higher orders were corrected, the person was more sensitive to any residual astigmatism.

From the results provided above, we can deduce that it is preferable to adjust residual astigmatism of the lenses according to the higher order aberrations in the eyes of the lens user.

Therefore, implementation concerning progressive lenses consists in customizing the design according to the higher orders in the eyes: for prescribing a lens, it is necessary to obtain a measure of the ocular aberrations in the eyes of the lens user. Subsequently, the design can be adjusted according to the average level of the higher orders of the lens user. The lower the RMS of higher order aberrations, the larger the areas without any astigmatism should be. The design may still be a standard design, without any correction of the higher orders of the eye.

Figure 5:
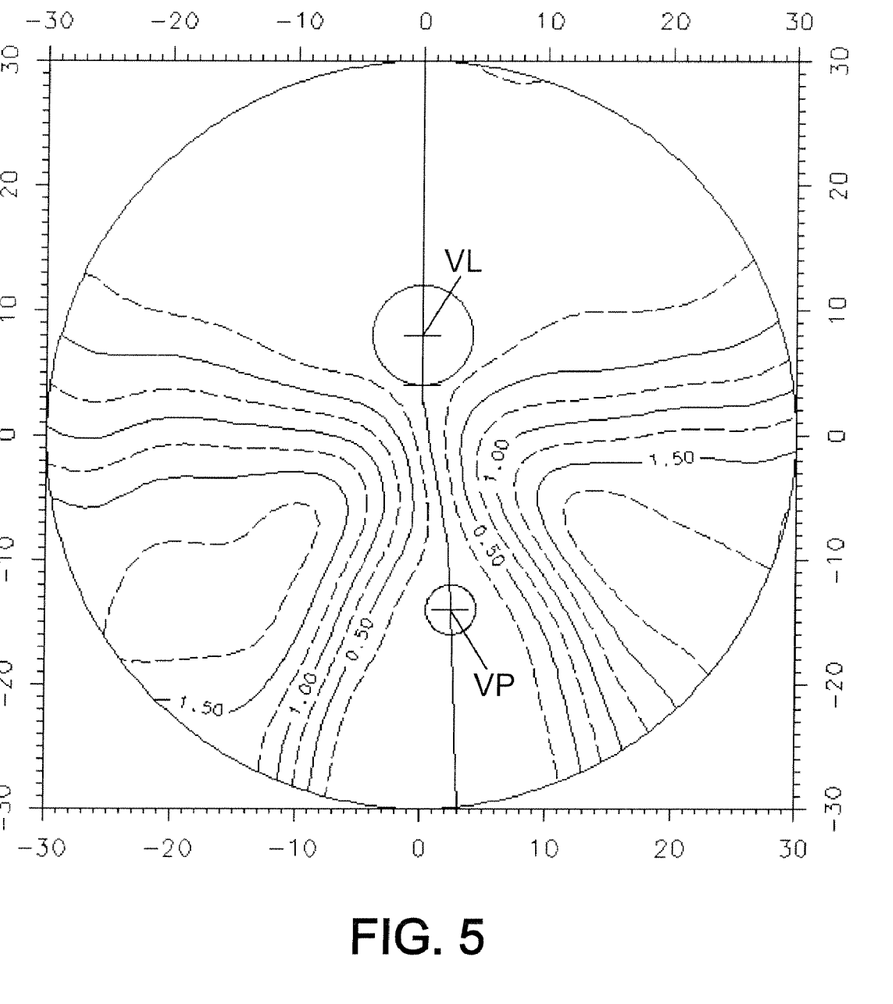
FIGS. 5 and 6 show two progressive addition lens designs.
Figure 6:
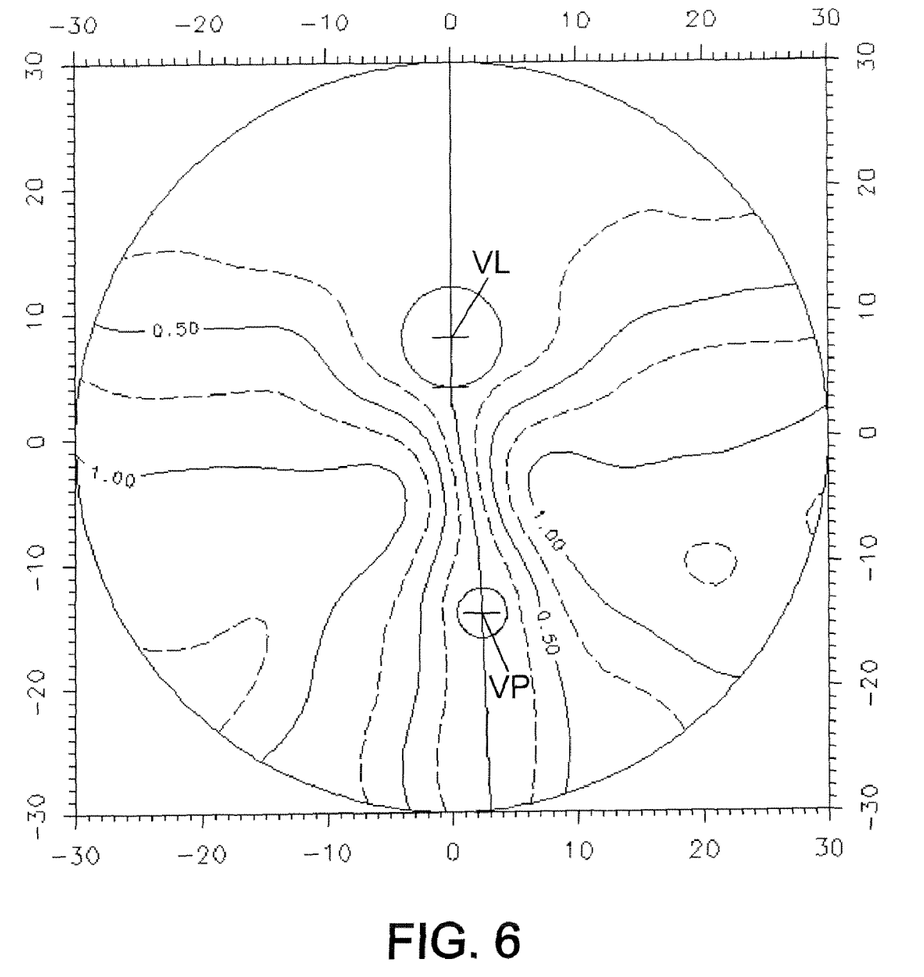

FIGS. 5 and 6 show two examples of a design of progressive lenses, with a distribution of astigmatism typically adjusted to two categories of lens users, depending on the RMS level of the higher orders.

FIG. 5 shows the astigmatism distribution of a design adjusted for people whose HOA RMS calculated on a 5 mm pupil is preferably less than 0.2 μm (and more preferably less than 0.15 μm).

FIG. 6 shows the astigmatism distribution of a design adjusted to people whose HOA RMS calculated on a 5 mm pupil is preferably more than 0.2 μm (and more preferably more than 0.4 μm). Because higher levels of astigmatism in areas of farsightedness (or FS) and in areas of nearsightedness (or NS) are tolerated, this second design is much softer than the first, and therefore adapting to it will be much easier in terms of distortions.

It is clear from the results obtained that the lens can also be optimized by adjusting the residual astigmatism axes in a customized manner to maximize visual performances based on the higher orders of the eye and their orientations.

Similarly, the prevailing higher aberration type plays a role in the combination with astigmatism. For example, when the higher orders are present mostly as spherical aberration, the astigmatism axis will have no effect. When the higher orders are present mostly as coma, the axis will play a primary role. Therefore, the design can be adjusted depending not only on the level but also on the prevailing type of aberration in the higher orders of the eye of the lens user.

The method according to the invention can also be used to optimize the selection of an already existing lens design. In particular, it is possible to either use or not use a function allowing for a better fit with a prescribed correction in the whole of the visual field, or a function taking into account assembly parameters and mode of wear, depending on higher order aberrations. For example, such functions can be used advantageously for persons whose HOA RMS calculated on a 5 mm pupil is less than 0.2 μm.

Figure 7:
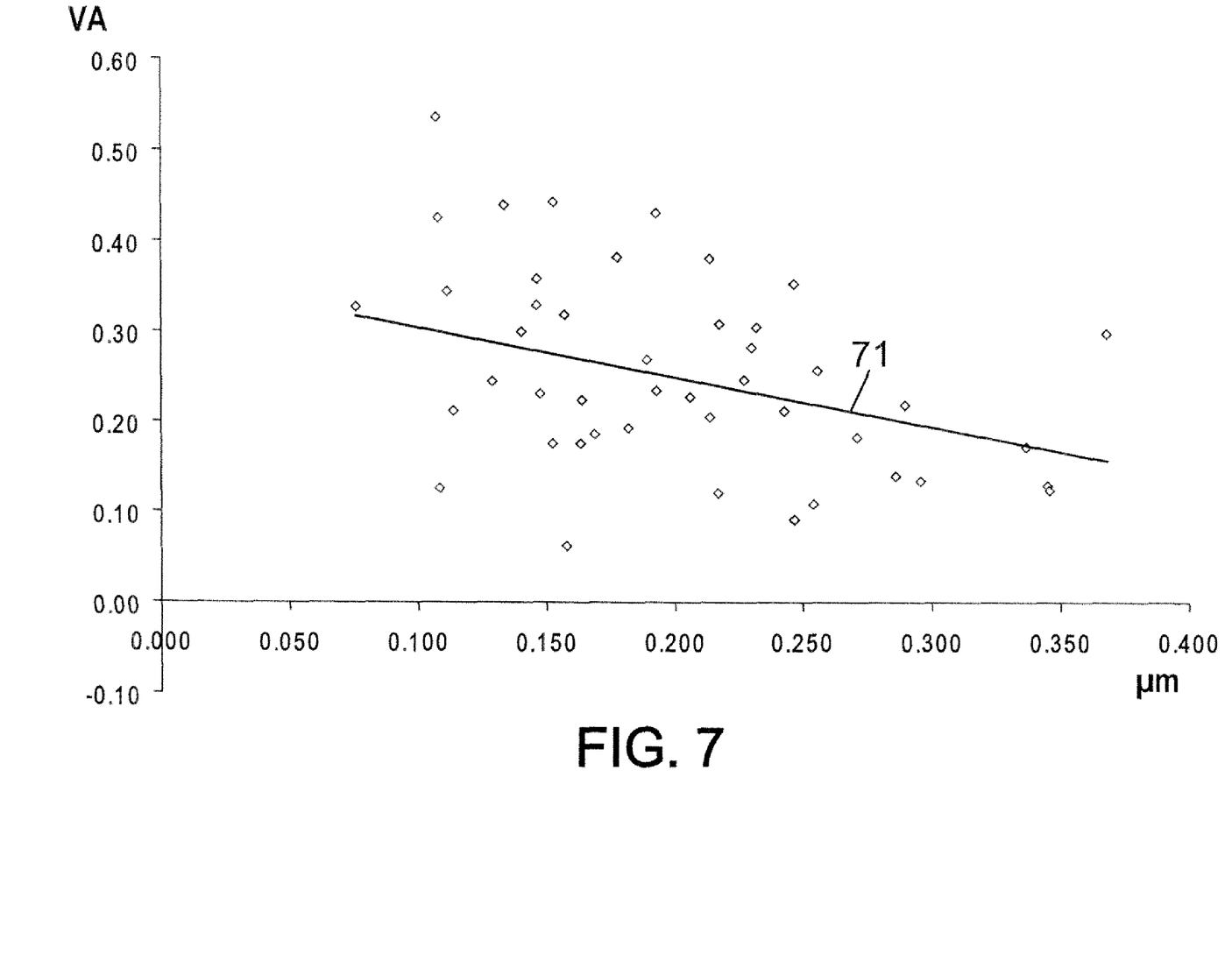
FIG. 7 shows results of visual acuity derivative according to higher order aberrations.

FIG. 7 shows results of visual acuity derivative (VA) according to higher order aberrations RMS values (in μm). The visual acuity derivative (VA) is calculated as the slope of the visual acuity variation as a function of added astigmatism power.

The inventors have established that said visual acuity derivative (VA) is highly dependant on the HOA RMS values and a mean dependence straight line 71 is plotted.

One can thus determine that the eye of a wearer which HOA RMS is low, as for an example comprised between 0.05 and 0.15 μm, is very sensitive (important visual acuity derivative), whereas the acuity of the eye of a wearer which HOA RMS is high, as for an example comprised between 0.25 and 0.40 μm, is of low sensitivity (low visual acuity derivative). Thanks to this teaching, one can advantageously provide a "hard design" spectacle ophthalmic lens to a wearer which HOA RMS is low and a "soft design" spectacle ophthalmic lens to a wearer which HOA RMS is high.

Figure 8A:
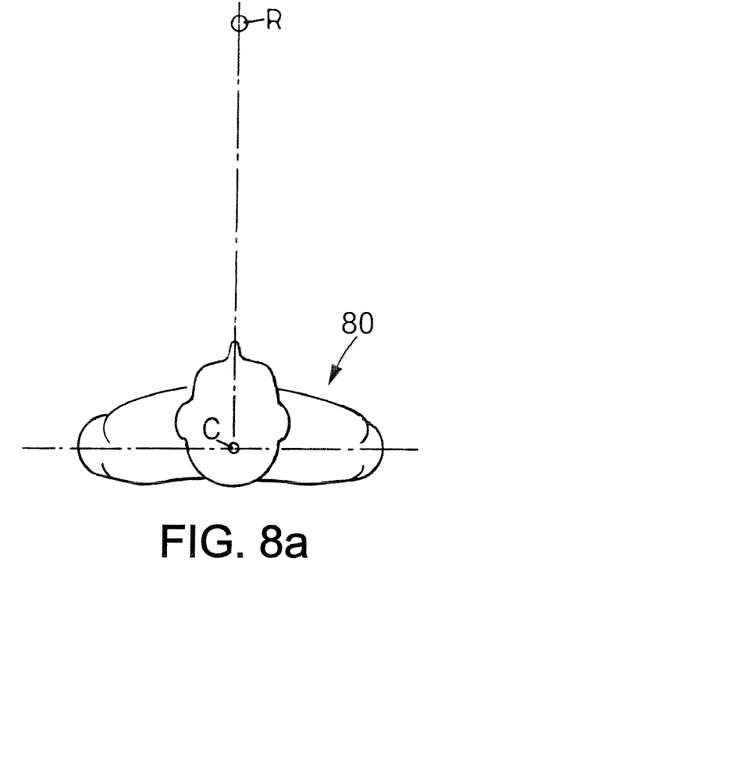
FIGS. 8a and 8b illustrate a principle of measurement of eyes and head movements for a spectacle lens wearer.

FIGS. 8a and b illustrate a principle of measurement of eyes and head movements for a spectacle lens wearer 80 when looking at a first target R situated in front of the wearer. The wearer firstly looks at said target R as shown on FIG. 8a and is then asked to look at a test target T without moving his shoulders as shown on FIG. 8b. The angular shift between both targets is called the eccentricity and referred as E. $\alpha_T$ is the head angular shift for the wearer 80 and $\alpha\gamma$ is his eyes angular shift whereas $E=\alpha_T+\alpha\gamma$. An eye-head coefficient EHC can be defined as a growing function of the ratio between $\alpha_T$ and E. According to an example $EHC=\alpha_T/E$. Details of said eyes and head measurement method are given in the patent publication WO 2008/104695 (namely on pages 5 and 6 of said document) which is hereby incorporated by reference.

Figure 8B:
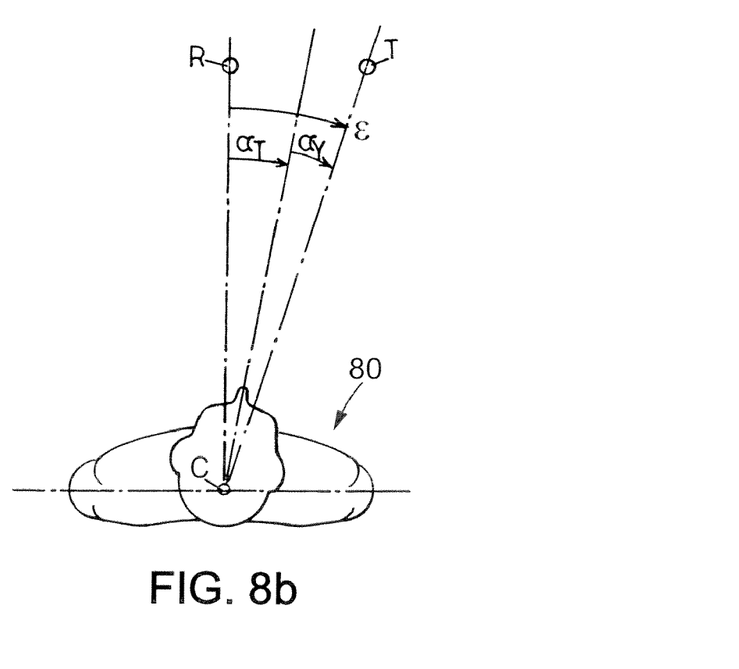

The EHC determined for a wearer can then be used as a parameter used to calculate the DP2 design parameter disclosed above.

According to an embodiment of the present invention, the design of the spectacle ophthalmic lens for a wearer is selected among a plurality of spectacle ophthalmic lens designs according to the present invention and the optical system of the lens for the wearer is obtained by combining the chosen design and the prescription data for the wearer.

According to another embodiment of the present invention, a design is calculated for a wearer by adapting the management of residual astigmatism based on the measure of higher order aberrations in the eye of the wearer.

Said design calculation may be implemented according to design calculation methods known from a man skilled in the art where a calculation parameter is related to the higher order aberrations in the eye of the wearer.

According to a design calculation method suitable for the present invention, a first design is selected and then modified in order to take into account said higher order aberrations. Optimization methods may be implemented where an optimization parameter is a high order aberration parameter.

According to an embodiment, an optimization parameter is the design parameter DP1.

According to another embodiment, an optimization parameter is the design parameter DP2.

According to an embodiment of the present invention, the method for manufacturing a spectacle ophthalmic lens for a wearer can be implemented thanks to the method described in the International Patent Application numbered PCT/FR2008/051618, filed on Sep. 11, 2008, in the name of ESSILOR INTERNATIONAL (Compagnie Générale d'Optique), where the value of "gain G qui a été calculée pour le porteur" (the gain factor G, which has been calculated for a wearer) would be equal to the design parameter DP2 of the present invention.

The invention has been described above with the aid of embodiments without limitation of the general inventive concept, in particular numerous calculation and/or manufacturing methods known from the man skilled in the art could be used in order to adapt the management of residual astigmatism according to the present invention.

The invention claimed is:

1. A method for providing a spectacle ophthalmic lens to a wearer, the method comprising the following steps:
   measuring the higher order aberrations in at least an eye of the wearer;
   calculating a design of the spectacle ophthalmic lens or selecting a design in a spectacle ophthalmic lens design data base, the calculating or selecting including adjusting residual astigmatism based on the measure of higher order aberrations in the eye of the wearer to provide a first amount of residual astigmatism over at least a portion of the lens for a first range of higher order aberrations and a second amount of residual astigmatism, different from the first amount, over at least a portion of the lens for a second range of higher order aberrations, different from the first range.

2. The method according to claim 1 wherein the calculation or selection of the design for the wearer is performed based on a higher order aberrations parameter calculated with the higher order aberrations measured data in the eye of the wearer and where said higher order aberration parameter is chosen from the list consisting of higher order aberrations RMS (root mean square) values (HOA RMS), the Strehl Ratio, the Pupil Ratio, and the Modulation Transfer Function (MTF) volume.

3. The method according to claim 2 wherein a design parameter (DP2) is used to calculate or select the design for the wearer, where:

$DP2=EHC+(1-EHC) \times DP$;

Where: EHC is the Eye-head coefficient;
   DP is a design parameter calculated thanks to a higher order aberrations parameter.

4. The method according to claim 1 wherein the spectacle ophthalmic lens is a spectacle progressive addition lens.

5. The method according to claim 4 wherein the calculation or the selection of the design for the wearer is performed according to a progressive addition lens hardness parameter.

6. The method according to claim 5 wherein the higher order aberration parameter is the HOA RMS value and wherein the calculation or the selection of the design for the wearer is performed so as the lower is the HOA RMS value, the harder is the design for the wearer and accordingly the higher is the HOA RMS value, the softer is the design for the wearer.

7. The method according to claim 6 wherein the higher order aberration parameter is the RMS value, wherein the higher order aberrations are measured for both left (L) and right (R) eyes and wherein a design parameter (DP1) is used to calculate or select the design for the wearer, where:

$DP1=((HOA\_RMS^2_R+HOA\_RMS^2_L)^{1/2}-HOA\_RMS_{min})/HOA\_RMS_{max}$ and where:
   $HOA\_RMS_R$ and $HOA\_RMS_L$ are respectively the HOA RMS values for the right eye and for the left eye;
   $HOA\_RMS_{min}$ and $HOA\_RMS_{max}$ are respectively a minimum and a maximum threshold value.

8. The method according to claim 1 wherein the higher order aberration parameter is the HOA RMS value and wherein if the HOA RMS value is less than 0.2 µm for a 5 mm pupil, the calculated or selected design for the wearer is a hard design and if the HOA RMS value is more than 0.2 µm for a 5 mm pupil, the calculated or selected design for the viewer is a soft design.

9. A computer program product comprising one or more stored sequence of instruction that is accessible to a processor and which, when executed by the processor, causes the processor to carry out the steps of claim 1.

10. A computer-readable medium carrying one or more sequences of instructions of the computer program product of claim 9.

11. The method according to claim 1 wherein the second amount is lower than the first amount, and the second range is lower than the first range.

12. The method according to claim 1 wherein providing the first and second amounts of residual astigmatism include providing a relatively low amount of residual astigmatism over a first portion of the lens for the first range of higher order aberrations, and providing a relatively low amount of residual astigmatism over a second portion of the lens for the second range of higher order aberrations, wherein the second portion of the lens is larger than the first portion of the lens.

13. The method according to claim 1 wherein the calculating or selecting includes adjusting an amount of residual astigmatism based on a level of higher order aberrations and based on a type of higher order aberrations.

14. A method for manufacturing a spectacle ophthalmic lens for a wearer, the method comprising the following steps:
 a) measuring the higher order aberrations in at least an eye of the wearer;
 b) calculating a design of the spectacle ophthalmic lens or selecting a design in a spectacle ophthalmic lens design data base, the calculating or selecting including adjusting residual astigmatism based on the measure of higher order aberrations in the eye of the wearer to provide a first amount of residual astigmatism over at least a portion of the lens for a first range of higher order aberrations and a second amount of residual astigmatism, different from the first amount, over at least a portion of the lens for a second range of higher order aberrations, different from the first range;
 c) providing a lens substrate;
 d) manufacturing the spectacle ophthalmic lens according to the optical system (OS) corresponding to the calculated or selected design in step b).

* * * * *